(12) United States Patent
Landry et al.

(10) Patent No.: US 9,982,514 B2
(45) Date of Patent: May 29, 2018

(54) DOWNHOLE PARAFFIN MELTING TOOL

(71) Applicant: Capital Oil Tools, Inc., Houma, LA (US)

(72) Inventors: Jarryd Landry, Hammond, LA (US); Russell Landry, Hammond, LA (US)

( * ) Notice: Subject to any disclaimer, the term of this patent is extended or adjusted under 35 U.S.C. 154(b) by 0 days. days.

(21) Appl. No.: 15/155,661

(22) Filed: May 16, 2016

(65) Prior Publication Data

US 2016/0333667 A1 Nov. 17, 2016

Related U.S. Application Data

(60) Provisional application No. 62/161,662, filed on May 14, 2015.

(51) Int. Cl.
*E21B 36/04* (2006.01)
*E21B 37/02* (2006.01)
*H01M 10/66* (2014.01)

(52) U.S. Cl.
CPC .............. *E21B 36/04* (2013.01); *E21B 37/02* (2013.01); *H01M 10/66* (2015.04); *H01M 2220/30* (2013.01)

(58) Field of Classification Search
CPC .................................. E21B 36/04; E21B 37/02
See application file for complete search history.

(56) References Cited

U.S. PATENT DOCUMENTS

| | | | |
|---|---|---|---|
| 1,232,736 A | 7/1917 | Truman et al. | |
| 3,438,444 A | 4/1969 | Wilkerson | |
| 5,168,929 A | 12/1992 | Galloway | |
| 6,043,995 A * | 3/2000 | Leuthen | E21B 43/128 363/37 |
| 6,076,603 A | 6/2000 | Perrin | |
| 6,260,637 B1 * | 7/2001 | Haussmann | E21B 10/445 175/420.1 |
| 8,066,060 B2 | 11/2011 | Herrmann | |

OTHER PUBLICATIONS

Wel & S, Inc., "Wels Hot Rod—A Batter Way to Remove Paraffin", 2014, www.welshotrod.com/home/tool.

* cited by examiner

*Primary Examiner* — Nicole Coy
*Assistant Examiner* — Kristyn A Hall
(74) *Attorney, Agent, or Firm* — Warner J. Delaune; Baker Donelson, et al.

(57) ABSTRACT

A downhole paraffin melting tool is provided, comprising a heating element housing having a cutting head and a heating element disposed within the heating element housing. A battery pack is disposed within a battery pack housing, wherein the battery pack is operatively connected to the heating element. A control board is disposed between the heating element and the battery pack, wherein the control board is adapted to control power delivered from the battery pack to the heating element. A top sub is connected to the battery pack housing, wherein the top sub includes a retrievable member. The battery pack, delivering power to the heating element through the control board, is adapted to maintain a predetermined temperature of the heating element during operation.

12 Claims, 6 Drawing Sheets

DOWNHOLE PARAFFIN MELTING TOOL

CROSS-REFERENCE TO RELATED APPLICATIONS

This nonprovisional application claims the benefit of priority to U.S. provisional application, Ser. No. 62/161,662, filed on May 14, 2015.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON COMPACT DISC

Not applicable.

BACKGROUND OF THE INVENTION

1. Field of the Invention

The present invention relates to oil well servicing and more particularly to a method and apparatus for removal of accumulated substances including paraffin deposits along an oil well tubing, and more particularly to such methods and apparatuses that do not require power through a wireline.

2. Prior Art and Background

Petroleum crude oil contains many constituents that can precipitate from the crude as it moves from the producing formation to the wellhead. One of those constituents is paraffin. The accumulation of paraffin within the production tubing of a working oil well is a major problem experienced throughout the petroleum industry. While the paraffin content of crude oil is variable, virtually all petroleum contains some paraffin that can result in the solidification of paraffin within the production tubing as the produced fluids travel from a downhole producing zone to the surface termination of the production tubing at a wellhead. As the buildup of solidified paraffin along the production tubing progresses, the ability to produce fluids through the tubing diminishes and eventually, in the worst case, the production tubing may become plugged to the point of preventing any flow of fluids. Plugging of the production tubing with substances found in the produced fluids, including paraffin deposits, requires servicing of the well for removal of the deposits before production of fluids can be resumed.

While paraffin may occur in most petroleum crude oil, the paraffin in each crude oil may have different characteristics and, in particular, may have a different melting temperature (or cloud point temperature). The temperature and pressure conditions will change along the passage of fluids from the producing zone within the formation through production tubing and the paraffin may solidify on the production tubing as the fluid cools in its path to the wellhead.

For example, a typical oil well temperature profile may show a temperature of 200° F. at 12,000 feet of depth within the well, a temperature of 170° F. at 7,000 feet of depth and a continued temperature reduction to the wellhead. If the produced fluids passing upward through the tubing in such a well contains paraffin having a cloud point lower than 170° F., it becomes possible for paraffin deposits to accumulate along the inner wall of the tubing at any location where the temperature is lower than 170° F. Continued accumulation of deposits could cause the well tubing to become blocked.

Many alternatives have been proposed for the prevention of paraffin buildup or the removal of paraffin deposits from production tubing including mechanical, chemical and electrical systems to keep the paraffin buildup from interfering with the production of fluids through the production tubing. Some of the alternative proposals are permanent installations within the producing well, while others are proposals for a servicing apparatus that is inserted through the wellhead and lowered to the tubing position needing servicing. Most well servicing tools or apparatus are tethered on a wire line, a tubing or a rod that lowers the tool through the wellhead to the servicing location cleaning the interior of the production tubing as the tool is lowered into the well or as the tool is raised to the wellhead. In the case of paraffin removal tools which employ heating elements, the wireline provides electrical power to the tool for raising the heating element temperature to a level required to melt the paraffin.

Petroleum wells may have well casing and production tubing within the casing and, in some wells, the production tubing may further include other tubings or rods that are inserted within the production tubing. When a plugged well tubing is serviced, some of the tubings within the production tubing must be removed to permit the entry of servicing tool. The process of removing tubing from a well bore, the insertion of a servicing tool and return of the tubing to put the well back into production is both time consuming and expensive. Most well servicing requires the use of well servicing rig or service company and an interruption of production through the well as the rig is put into place and a servicing tool is run into and out of the well.

In light of the foregoing background information, it has become apparent that there is a need for a method and apparatus for providing inexpensive and dependable removal of paraffin buildup along the interior of production tubing in a petroleum well. Further, it would be desirable to provide an apparatus that may be placed into a well tubing without the need of a servicing rig and without the need for extended interruption of production from the well. Moreover, it would be desirable to provide an apparatus that operates from onboard battery power, avoiding the requirement for electrical power from a wireline. An apparatus capable of the foregoing would have to overcome a number of challenges, including: (1) potentially long resident times downhole for the paraffin melting tool; (2) high temperatures for the heating element required to quickly and consistently melt the paraffin; (3) high power output from the batteries to continuously generate the required temperatures in the heating element; (4) battery management technology that can balance the required power output with maximum operating times downhole; and (5) a very narrow environment in the well tubing, which imposes significant design constraints. It is believed that the present invention addresses all of these challenges, and that it provides a new and innovative method and apparatus to remove paraffin deposits.

SUMMARY OF THE INVENTION

A downhole paraffin melting tool is provided, comprising a heating element housing having a cutting head and a heating element disposed within the heating element housing; a battery pack disposed within a battery pack housing, wherein the battery pack is operatively connected to the heating element; a control board operatively connected between the heating element and the battery pack, wherein the control board is adapted to control power delivered from the battery pack to the heating element; and a top sub connected to the battery pack housing, wherein the top sub includes a retrievable member.

In a preferred embodiment, the heating element housing includes a heat transfer fluid surrounding the heating element.

In another embodiment, the cutting head includes a plurality of cutting edges converging to a pointed tip.

Preferably, the control board is disposed within a control board housing attached between the heating element housing and the battery pack housing.

In a further embodiment, the battery pack includes a plurality of rechargeable batteries connected in parallel.

Preferably, the cutting head is threadably and sealably connected to the heating element housing, the control board housing is threadably and sealably connected to the heating element housing, the control board housing is threadably and sealably connected to the battery pack housing, and the top sub is threadably and sealably connected to the battery pack housing.

In a preferred embodiment, the battery pack is adapted to deliver at least 400 Watts of power to the heating element, and the battery pack is adapted to cause the heating element to reach a temperature of at least 500 degrees Fahrenheit.

More preferably, the control board is adapted to deliver a predetermined pulse of power to the heating element at a predetermined frequency.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

DETAILED DESCRIPTION OF THE INVENTION

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs. Unless otherwise specified herein, all materials of construction are preferably stainless steel resistant to the corrosive effects common in downhole environments.

Mechanical Design of the Paraffin Melting Tool

Figure 1A:
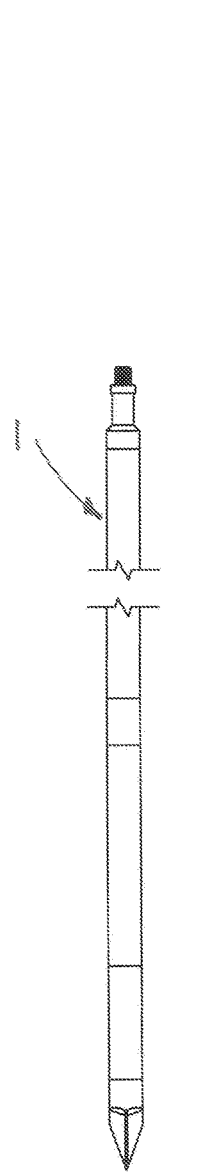
FIGS. 1A-1C show a side view, an exploded view, and an exploded sectional view of a preferred embodiment of the paraffin melting tool of the present invention.
Figure 1B:
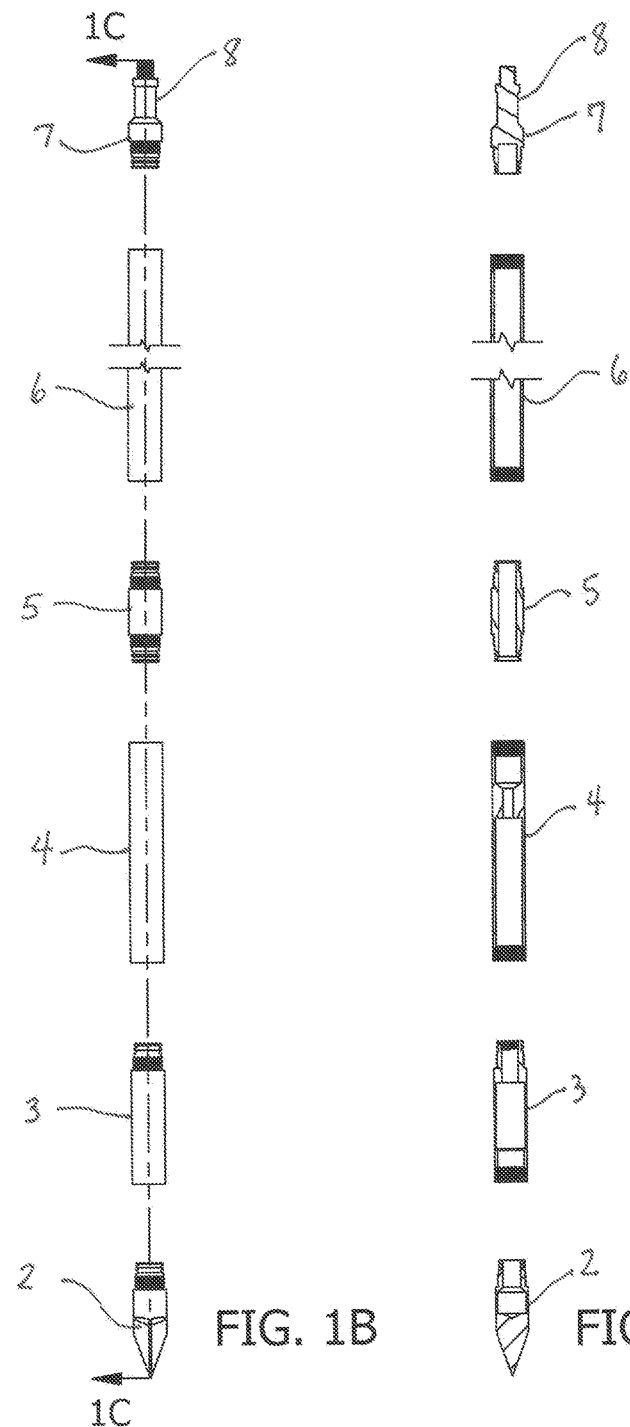
Figure 1C:
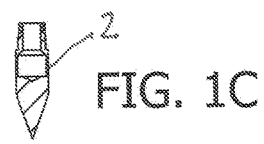

Turning now to the figures, a preferred embodiment of a paraffin melting tool 1 in accordance with the present invention is shown in FIGS. 1A-1C. FIG. 1A depicts an external view of the tool 1 in its fully assembled configuration, while FIG. 1B depicts the tool 1 in an exploded view to illustrate the various parts. FIG. 1C depicts an exploded sectional view of the tool 1 where the internal electronic and heating components are removed for clarity. Generally, the external parts of the tool 1 comprise a heating tip 2, heating element housing 3, control board housing 4, bridge connector 5, battery pack housing 6, and top sub 7 having a retrievable neck 8, where the aforementioned parts are threadably and sealably connected to one another and as will be further described below.

Figure 2:
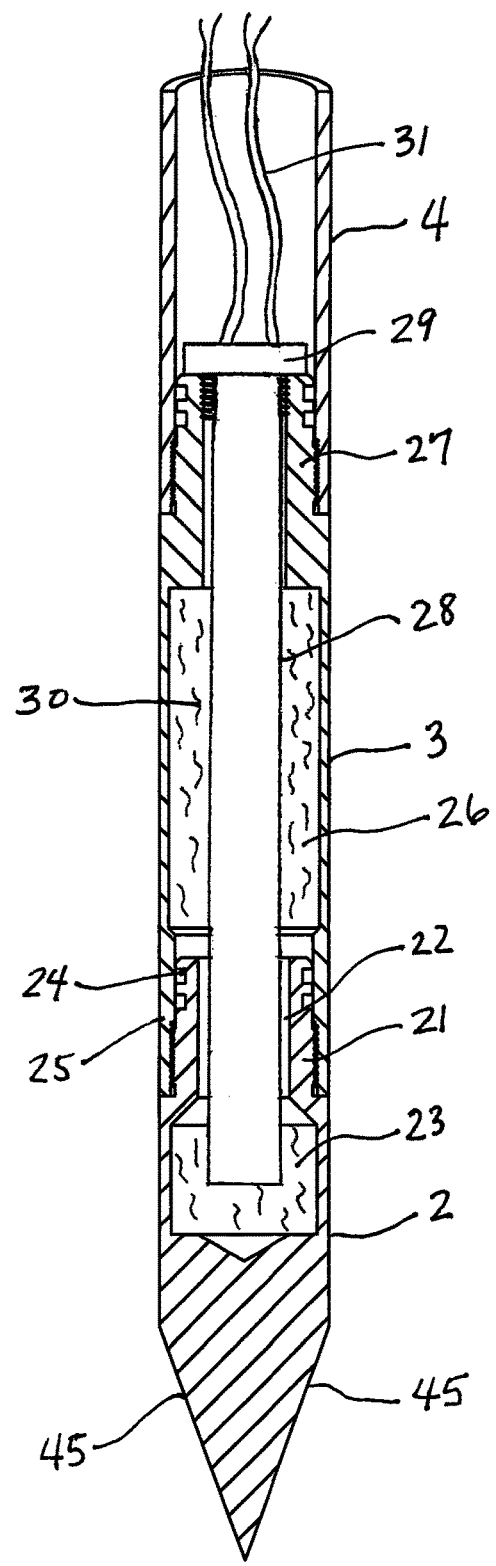
FIG. 2 shows a side sectional view of the heating tip of the tool of FIG. 1.

As best shown in FIG. 2, heating tip 2 or "spear" is a sharp or pointed tip which can pierce through solidified paraffin or other downhole deposits, and which extends from an externally threaded base 21. It may include a plurality of cutting edges 45 converging to a pointed tip.

Heating tip 2 includes a lower bore 22 and lower fluid chamber 23 which partially retains a heat transfer fluid as will be further explained. The threaded base 21 of heating tip 2 is connected to the internally threaded bottom end 25 of the heating element housing 3 and includes elastomeric members 24 to establish a seal at such threaded connection. The heating element housing 3 generally comprises a cylindrically shaped member which includes an upper fluid chamber 26 residing below an externally threaded upper end 27. A heating element 28 having an upper head 29 is threadably connected to an internally threaded upper bore formed in the heating element housing 3, and the heating element 28 extends through the upper fluid chamber 26 and into the lower fluid chamber 23. The heating element 28 further includes a thermocouple or other temperature sensing device to detect temperature of the element, and this data is sent to the control board 32. Wire leads 31 extend from the upper head 29 for providing electrical energy to the heating element 28 from the control board 32, as well as to transfer temperature data back to the control board 32. Within this sealed arrangement, the upper bore, upper fluid chamber 26, lower bore 22, and lower fluid chamber 23 are filled with a heat transfer fluid 30, such as the product marketed under the name "Dynalene" by Dynalene, Inc., such that the heat transfer fluid 30 fully surrounds the heating element 28. When the heating element 28 is energized, the heat transfer fluid 30 transfers heat from the heating element 28 to the heating element housing 3 and the heating tip 2.

Figure 3:
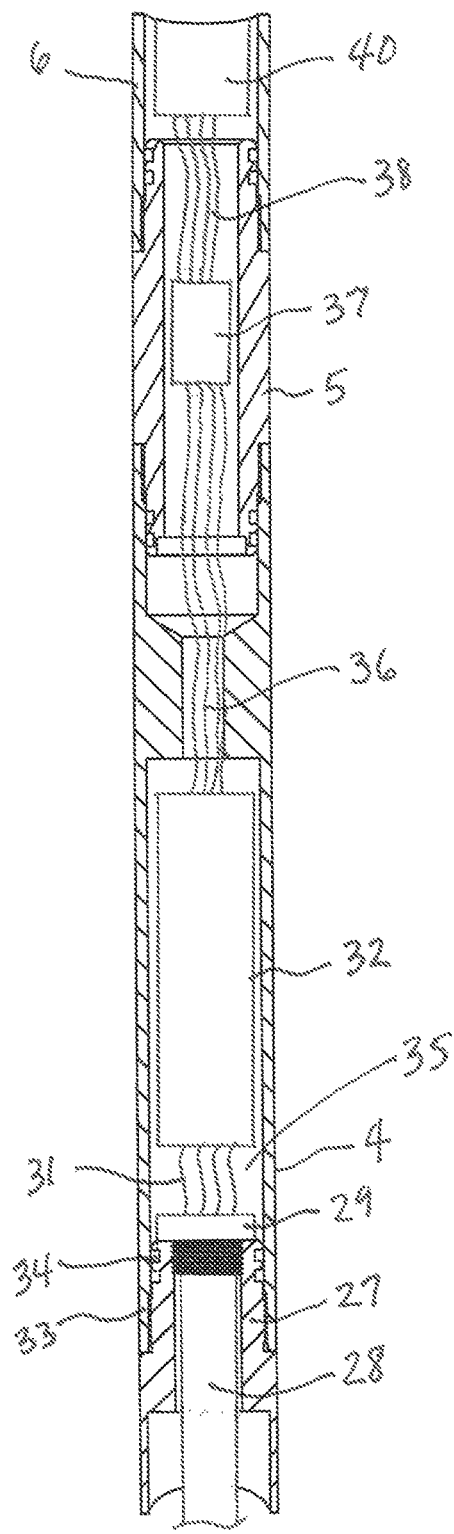
FIG. 3 shows a side sectional view of the control board housing and bridge connector of the tool of FIG. 1.

As best shown in FIG. 3, the control board housing 4 includes an internally threaded lower end 33 for matably engaging the upper end 27 of the heating element housing 3, and which includes elastomeric members 34 for establishing a sealed relationship. Control board housing 4 includes an internal cavity for containing a control board 32 which controls and delivers the energy from a battery pack 40 to the heating element 28. If needed, appropriate insulating material 35 may disposed between the control board 32 and the upper head 29 of heating element 28 to protect the control board 32 from excessive heat which may otherwise damage the electronic components. Additional wire leads 36 extend from the control board 32 to a connector 37 which allows for easy connection and disconnection from the batter pack 40. The connector 37 may reside within the bridge connector 5 which is threadably and sealably connected to the control board housing 4 similar to the manner explained previously. Additional wire leads 38 extend from the connector 37 to the battery pack 40.

Figure 4:
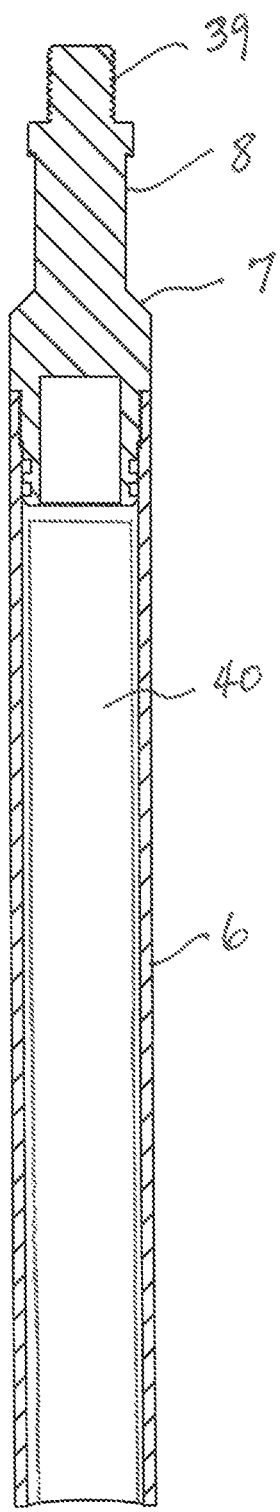
FIG. 4 shows a side sectional view of the battery pack housing and retrievable neck of the tool of FIG. 1.

As best shown in FIGS. 3 and 4, the battery pack housing 6 is generally a long cylindrical member threadably and sealably connected to the bridge connector 5 in a manner similar to the previously described components of the tool 1. The battery pack 40 is preferably a collection of lithium ion rechargeable batteries (typically Type 18650) connected in parallel and managed by a small control board, where the batteries and control board are encased within a unitary fiberglass casing, as is commonly seen in the art. In one embodiment, the battery pack 40 comprises about 36 Type 18650 batteries, resulting in a battery pack 40 capable of providing 48 volts and 8-9 amps in a 48" long configuration. As will be understood, many variations on this example may include changes in the number of batteries, the voltage, and current, all of which should be based on conditions in the field, such as duration of time downhole, temperature conditions, heating requirements, and related factors. Ideally, the tool 1 should be capable of operating for at least 1.5 to 2 hours downhole and with a heating tip 2 temperature in the range of 350-500 degrees Fahrenheit. Because typical paraffin melting temperature is about 150 degrees Fahrenheit, higher temperatures of the heating tip 2 should result in faster melting and better clearance of downhole obstructions.

Above the battery pack housing 6, a top sub 7 with a retrievable neck 8 is threadably and sealably connected to the battery pack housing 6. The retrievable neck 8 includes an externally threaded end 39 to provide for attachment to other commonly employed downhole retrieving devices.

Figure 5A:
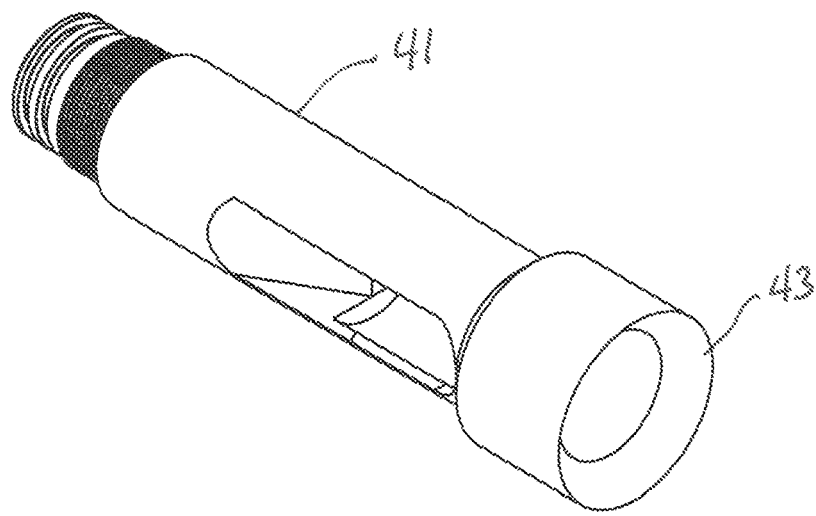
FIG. 5A and 5B show an alternative embodiment of a heating and scraping tip that can be employed with the tool of FIG. 1.
Figure 5B:
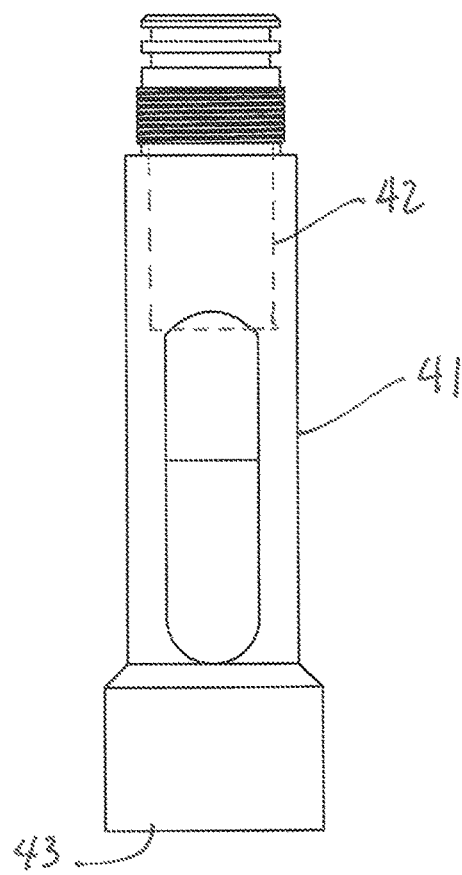

In an alternative embodiment shown in FIGS. 5A and 5B, an alternative to the heating tip 2 is shown to comprise a modified gauge cutter 41 having an internal cavity 42 similar to the lower chamber 23 and bore 22 of the heating tip 2. Thus, the heating element 28 may reside within the cavity 42 and provide heat to the surround metal structure the gauge cutter 41, while the cutting edge 43 physically cuts and moves solidified paraffin away from the walls of the well tubing.

Control Board Design and Operation

For proper operation of the paraffin melting tool 1, the battery pack 40 must have high discharge capabilities and be capable of pulsing the energy out of the battery pack 40 in intervals that result in a longer operating time for the battery pack 40, but while still generating sufficient heat around the heating element housing 3 and the heating tip 2. In a typical operating configuration, the control board 32 must fit within a relatively small, i.e. a one and a quarter inch (1.25") control board housing 4. Such design will reduce the frequency of replacing the rechargeable battery packs 40, resulting in more cost effective operation of the tool 1.

Figure 6A:
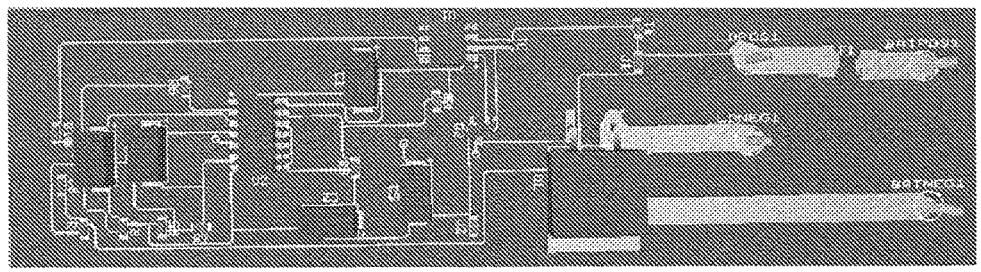
FIG. 6A shows a detail view of the control board.
Figure 6B:
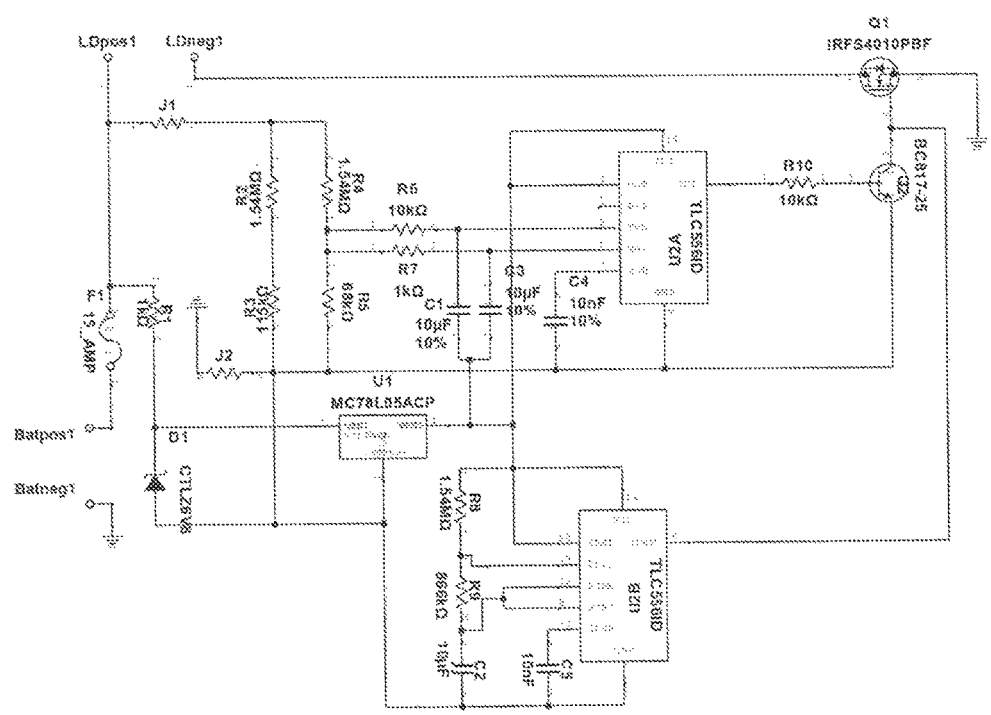
FIG. 6B shows a schematic diagram of one embodiment of the control electronics.

With reference to FIGS. 6A and 6B, the control board 32 should be able to operate a large heating element of four hundred watts (400 W) in its narrow space, without damaging the battery pack 40, with the ability to extend the energy reserve for a longer operating time. In a preferred embodiment, by applying a pulse to the battery pack 40, energy is released into the load in bursts, which causes the battery pack 40 to rest every six (6) seconds allowing the chemical reaction within the batteries to stabilize and prepare for subsequent bursts. The control board 32 board should consume the least amount of power as possible from the battery pack 40 and deliver maximum power to the heating element 28.

The electrical schematic of FIG. 6B shows the details of the control board having the above features. By calculating a timing circuit with the 556 timer, this dual-type timer and its associated capacitors and resistors will allow one of its timers to operate at sixty two percent (62%) of the time. This timer will allow a sixteen second gap to enable the battery bank to be connected to the load for sixteen seconds. Then, for thirty two percent (32%) of the time the battery pack 40 will rest for about six seconds. The total consumption of power for the board at resting period is about 30 mA, while during full operation would be approximately 9 A. There is also an error detection circuit for sensing the battery voltage. If the voltage descreases below a calculated low threshold point, the circuits trips its operation and remains with its low power state of 30 mA. If the battery pack 40 is not completely depleted and can reach the upper threshold point, the error detection circuit turns off, allowing the circuit to operate normally by connecting the battery pack 40 to the heating element 28. This sequence continues until the battery pack 40 is depleted by not being able to achieve the upper threshold point in which the circuit remains in battery protect mode, thereby protecting the battery pack 40 from damage.

The power stage is designed to accommodate the necessary power to the heating element 28. This is comprised of a metal oxide semiconductor transistor, which is a high power MOSFET with the ability to withstand the necessary power for the circuit. The protection transistor is an NPN transistor used to switch off and on the base voltage from the MOSFET for the purpose of error and battery protection. The Zener diode is a 6.8 volt Zener designed to regulate the pre-working voltage to an acceptable level by causing a stepdown of the operating battery pack 40 from forty-eight volts (48 V) to six point eight volts (6.8 V), a tolerable level for the input of the 5 V regulator, which is the operating voltage for the electronics of the control board 32. Preferably, all of the electronic components should mount on an FR-4, 2 oz. double-sided board.

Such a control board 32 will enable the electronics to be interconnected with traces of ten mils and the power section to be interconnected with traces of 125 mils. Because of its compact size, the second side of the control board 32 will be used to place a 125 mil trace to handle the other half of the high power current. Therefore, the connection posts and the drain and source of the transistor must be routed on top and bottom of the control board 32, and the heating element 28 and battery pack 40 must be connected to the two traces simultaneously to allow for the control board 32 to withstand the total current.

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A downhole paraffin melting tool, comprising:
    (a) heating element housing having a first internal chamber;
    (b) a cutting head connected to the heating element housing, wherein the cutting head includes a second internal chamber, wherein the first internal chamber and the second internal chamber form a sealed volume;
    (c) a heating element sealably disposed within the first internal chamber and the second internal chamber, wherein the heating element is in thermal communication with the cutting head and the heating element housing;
    (d) a battery pack disposed within a battery pack housing, wherein the battery pack is operatively connected to the heating element;
    (e) a control board operatively connected between the heating element and the battery pack, wherein the control board is adapted to control power delivered from the battery pack to the heating element, and further adapted to deliver a predetermined pulse of power to the heating element at a predetermined frequency; and
    (f) a top sub connected to the battery pack housing, wherein the top sub includes a retrievable member.

2. The tool of claim 1, wherein the first internal chamber and the second internal chamber contain a heat transfer fluid surrounding a portion of the heating element, and wherein the heat transfer fluid transfers heat from the heating element to the heating element housing and the cutting head.

3. The tool of claim 1, wherein the cutting head includes a plurality of cutting edges converging to a pointed tip.

4. The tool of claim 1, wherein the control board is disposed within a control board housing attached between the heating element housing and the battery pack housing.

5. The tool of claim 1, wherein the battery pack includes a plurality of rechargeable batteries connected in parallel.

6. The tool of claim 1, wherein the cutting head is threadably and sealably connected to the heating element housing.

7. The tool of claim 4, wherein the control board housing is threadably and sealably connected to the heating element housing.

8. The tool of claim 4, wherein the control board housing is threadably and sealably connected to the battery pack housing.

9. The tool of claim 1, wherein the top sub is threadably and sealably connected to the battery pack housing.

10. The tool of claim 1, wherein the battery pack is adapted to deliver at least 400 Watts of power to the heating element.

11. The tool of claim 1, wherein the battery pack is adapted to cause the heating element to reach a temperature of at least 500 degrees Fahrenheit.

12. The tool of claim 1, wherein the battery pack is adapted to provide a predetermined temperature of the heating element for at least one hour.

* * * * *